United States Patent
Xu et al.

(10) Patent No.: US 10,169,579 B1
(45) Date of Patent: Jan. 1, 2019

(54) MALICIOUS PDF DETECTION

(71) Applicant: Palo Alto Networks, Inc., Santa Clara, CA (US)

(72) Inventors: Wei Xu, State College, PA (US); Xinran Wang, San Ramon, CA (US); Huagang Xie, Pleasanton, CA (US); Yanxin Zhang, San Ramon, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 81 days.

(21) Appl. No.: 13/631,518

(22) Filed: Sep. 28, 2012

Related U.S. Application Data

(60) Provisional application No. 61/607,472, filed on Mar. 6, 2012.

(51) Int. Cl.
*G06F 21/56* (2013.01)
*H04L 29/06* (2006.01)
*G06F 21/00* (2013.01)
*G06F 21/57* (2013.01)

(52) U.S. Cl.
CPC .............. *G06F 21/56* (2013.01); *G06F 21/00* (2013.01); *G06F 21/577* (2013.01); *H04L 63/1433* (2013.01)

(58) Field of Classification Search
CPC .............. H04L 63/433; H04L 63/1441; H04L 63/1443; H04L 63/1416; H04L 63/1425; G06F 21/1577; G06F 21/51; G06F 21/56; G06F 21/577; G06F 21/563
USPC ............... 709/225, 229; 726/22–25; 707/755
See application file for complete search history.

(56) References Cited

U.S. PATENT DOCUMENTS

| | | | |
|---|---|---|---|
| 8,261,366 B2 * | 9/2012 | Shuster | G06F 21/564 705/50 |
| 8,407,789 B1 * | 3/2013 | Mears | 726/22 |
| 8,448,245 B2 * | 5/2013 | Banerjee et al. | 726/22 |
| 8,499,283 B2 * | 7/2013 | Mony | 717/115 |
| 8,997,219 B2 * | 3/2015 | Staniford | H04L 63/1416 726/22 |
| 2011/0247072 A1 * | 10/2011 | Staniford | H04L 63/1416 726/24 |
| 2011/0289582 A1 * | 11/2011 | Kejriwal et al. | 726/22 |
| 2012/0084859 A1 * | 4/2012 | Radinsky et al. | 726/23 |
| 2013/0097705 A1 * | 4/2013 | Montoro | 726/24 |
| 2013/0145466 A1 * | 6/2013 | Richard et al. | 726/23 |

OTHER PUBLICATIONS

Pavel Laskov and Nedim Šrndic. 2011. "Static Detection of Malicious JavaScript-Bearing PDF Documents". In Proceedings of the 27th Annual Computer Security Applications Conference (ACSAC '11). ACM, New York, NY, USA, 373-382. DOI=10.1145/2076732.2076785 http://doi.acm.org/10.1145/2076732.2076785.*

(Continued)

*Primary Examiner* — Saleh Najjar
*Assistant Examiner* — Feliciano S Mejia
(74) *Attorney, Agent, or Firm* — Van Pelt, Yi & James LLP

(57) ABSTRACT

Detecting malicious PDF documents is disclosed. A PDF document is received. The PDF is classified using a classifier. The classifier is trained at least in part by using one of the following: (1) a feature associated with embedded script code; (2) a feature associated with a PDF action; and (3) a feature associated with a PDF structure.

15 Claims, 8 Drawing Sheets

(56) References Cited

OTHER PUBLICATIONS

Kittilsen, J., "Detecting malicious PDF documents. Published 2011, Jan. 12; Retrieved Sep. 5, 2018, from https://brage.bibsys.no/xmlui/handle/11250/144014)" (Year: 2011).*

Baccas, Finding Rules for Heuristic Detection of Malicious PDFs: with Analysis of Embedded Exploit Code, Virus Bulletin Conference Sep. 2010, Published 2010, pdfs.sernanticscholar.org/a265/745ac08159dd3d8aa0fe2cc5f7e465bd3200.pdf. (Year: 2010).*

Tao et al. "A Novel Framework for Learning to Detect Malicious Web Pages," 2010 International Forum on Information Technology and Applications, Kunming, 2010, pp. 353-357; http://ieeexplore.ieee.org/stamp/stamp.jsp?tp=&arnumber=5634775&isnumber=5634735 (Year: 2010).*

Jarle Kittilsen, "Detecting malicious PDF documents", master thesis for Department of Computer Science and Media Technology, Gjøvik University College, Norway; Jan. 12, 2011.

Babu et al., "Adaptive Ordering of Pipelined Stream Filters", 2014.

\* cited by examiner

```
function heapspray() {
    var nop = unescape('%u9090%u9090');
    var shellcode =
unescape("%u56e8..........%u246c");

while (nop.length <= 0x10000/2) {
        nop += nop;
    }
    nop = nop.substring(0, 0x10000/2 -
shellcode.length);
    memory = new Array();
    for (i=0; i<0x1000; i++) {
        memory[i] = nop + sc;
    }
} heapspray();
Try {
    this.media.newPlayer(null);
}
catch (e) {}
```

FIG. 4

| Suspicious JavaScript Function | Indication |
|---|---|
| eval() | obfuscation |
| str.concat() | obfuscation |
| str.replace() | obfuscation |
| str.fromCharCode() | obfuscation |
| str.split() | obfuscation |
| str.substr() | obfuscation |
| str.substring() | obfuscation |
| util.printf() | CVE-2008-2992 |
| doc.media.newPlayer() | CVE-2009-4324 |

FIG. 6

| Potentially Harmful PDF Action | Definition |
|---|---|
| /Action | A class of actions triggered by user |
| /OpenAction | A class of actions triggered by opening the PDF file |
| /GoTo | [F] redirection within the document |
| /GoToR | [F] redirection to external src |
| /GoToE | [F] redirection to embedded file |
| /Launch | [F] launch an application |
| /SubmitForm | [F] send interactive data to a URL |
| /URI | [F] Access remote URL |
| /ImportData | [F] Import external data |

FIG. 7

| Filter | Usage | Malicious(%) | Benign(%) |
|---|---|---|---|
| FlateDecode | Compression | 77.54 | 88.76 |
| LZWDecode | Compression | 0.47 | 12.42 |
| ASCII85Decode | Compression | 1.25 | 11.85 |
| ASCIIHexDecode | Compression | 9.47 | 0.10 |
| RunLengthDecode | Compression | 0.24 | 0.47 |
| JBIG2Decode | Compression (pic/media) | 0.78 | 0.03 |
| RichMedia | Compression (pic/media) | 0.26 | 0 |
| DCTDecode | Compression (pic/media) | 2.08 | 42.81 |
| Crypt | Encryption | 0.04 | 0.46 |
| Encrypt | Encryption | 0.91 | 10.81 |

FIG. 8

| Feature | Note |
|---|---|
| Number of filters > 2 for one stream object | excessive number of filters |
| Suspicious filters pipeline | e.g., [/JBIG2Decode /DCTDcode /ASCIIHexDecode] |
| Escaped filter name | #hh in a filter name, e.g., /A#53#43#49#49#48#65#78Dec#6f#64e |
| Unknown filter name | Filters that are not supported by PDF format |

FIG. 9

MALICIOUS PDF DETECTION

CROSS REFERENCE TO OTHER APPLICATIONS

This application claims priority to U.S. Provisional Patent Application No. 61/607,472 entitled MALICIOUS PDF DETECTION filed Mar. 6, 2012 which is incorporated herein by reference for all purposes.

BACKGROUND OF THE INVENTION

Portable Document Format (PDF) files are an example of an increasingly popular vector for malware distribution and other malicious activities. Unfortunately, existing approaches for detecting malicious PDFs or malicious content within a document, such as a PDF document, are limited by their run-time performance and scalability. Accordingly, there exists an ongoing need for improved techniques for detecting malicious documents and for managing detection resources.

BRIEF DESCRIPTION OF THE DRAWINGS

Various embodiments of the invention are disclosed in the following detailed description and the accompanying drawings.

FIG. 4 illustrates an example of a vulnerable JavaScript function.

FIG. 6 illustrates an example list of suspicious JavaScript function invocations.

FIG. 7 illustrates an example list of potentially harmful PDF actions.

FIG. 8 illustrates a list of PDF stream filters and their usage.

FIG. 9 illustrates an example list of filter related features.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
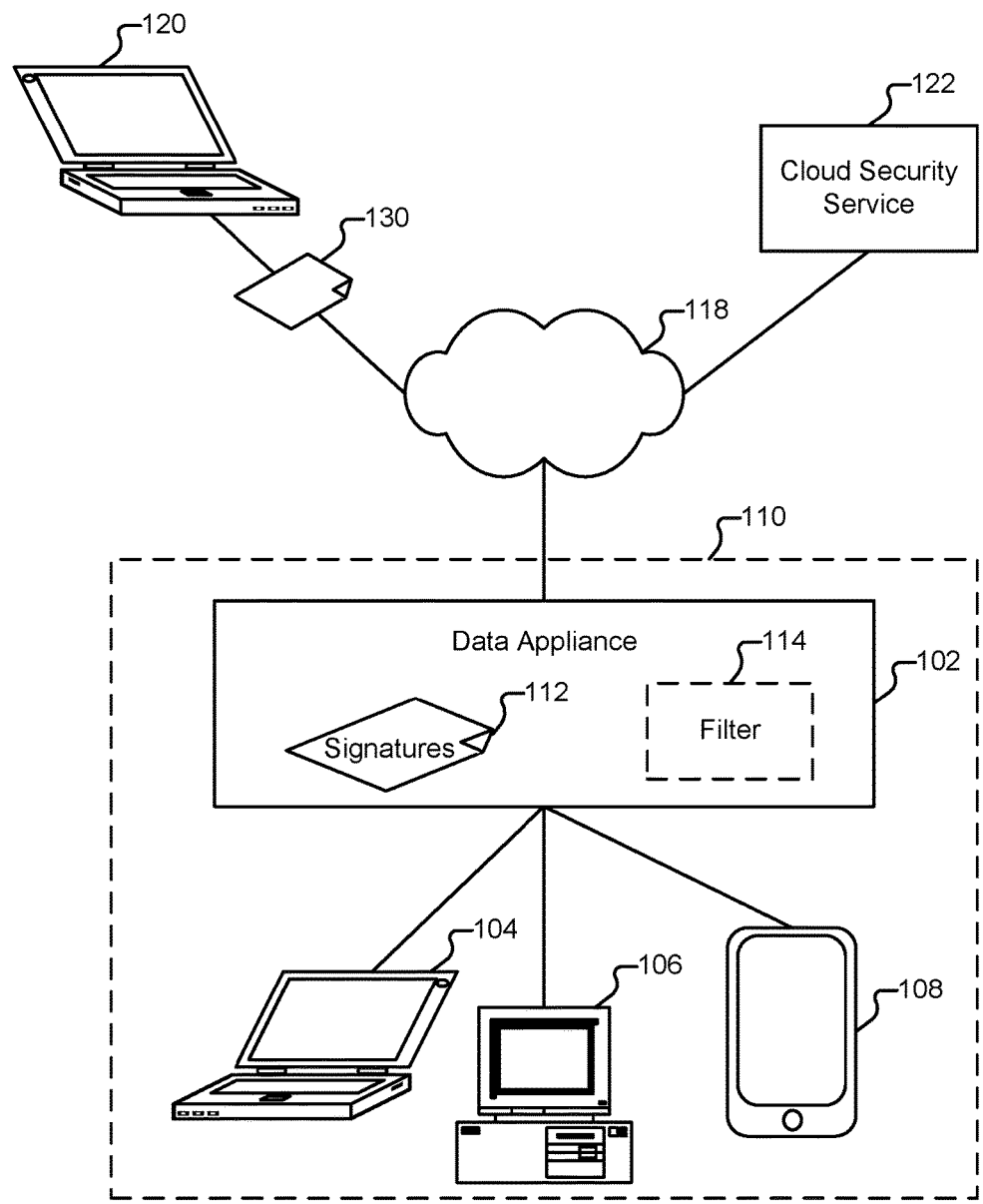
FIG. 1 illustrates an example of an environment in which documents are analyzed for malware.

FIG. 1 illustrates an example of an environment in which documents are analyzed for malware. In the example shown in FIG. 1, client devices 104-108 are a laptop computer, a desktop computer, and a tablet (respectively) present in an enterprise network 110. Data appliance 102 is configured to enforce policies regarding communications between clients, such as clients 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website downloads, files exchanged through instant messaging programs, and/or other file transfers. In some embodiments, appliance 102 is also configured to enforce policies with respect to traffic that stays within enterprise network 110.

Data appliance 102 can be configured to analyze documents, such as PDF documents, for the presence of malicious elements. As one example, suppose a nefarious user of host 120 attempts to transmit a malicious PDF document 130 to client 104 via network 118. The nefarious individual hopes that a user of client 104 will open the compromised PDF in a reader application, allowing the PDF to exploit a vulnerability in the reader to ultimately run arbitrary code on client 104. Appliance 102 is configured to inspect the document and only provide the document to client 104 if the document is determined to be benign.

In some embodiments, data appliance 102 maintains a list of signatures 112. The signatures can correspond to known malicious documents (or portions thereof) and can also correspond to known safe documents. If a signature associated with document 130 is present in the list of known malicious document signatures, data appliance 102 can take an appropriate action, such as preventing the transmission of the document to client 104, generating an alert, quarantining the document, etc. Similarly, if another document is received (e.g., for client 106) and has a signature corresponding to a known-benign document, the document can be delivered accordingly. Data appliance 102 may generate such signatures itself; it may also/instead receive a list of signatures of known-malicious files as part of a subscription (e.g., provided by cloud security service 122).

In some cases, data appliance 102 may not have a signature that corresponds to document 130. Analysis can be performed on the document to determine whether to allow its transmission to client 104 or not. As will be described in more detail below, data appliance 102 includes a filter 114 that can quickly identify benign PDFs with high precision. The filtering can be used as a pre-process to allow computational resources to be focused on performing in-depth and/or dynamic analysis of likely malicious PDFs. Filter 114 makes use of machine learning techniques. In particular, a set of features that are predictive of malicious content in a PDF are selected and used to derive a classification model. The model is trained on known benign and known malicious PDF documents.

In some embodiments, appliance 102 performs the in-depth analysis of documents flagged as likely malicious by filter 114. In other embodiments, appliance 102 performs the in-depth analysis at least in part in cooperation with one or more additional appliances. As one example, data appliance 102 can be configured to provide copies of documents flagged by filter 114 as likely malicious to cloud security service 122 for in-depth real-time analysis.

If a document is ultimately determined to be malicious (whether by appliance 102, service 122, or a combination of the two), appliance 102 can automatically block the transmission of the document to client 104 (and any other applicable clients) based on the analysis result. Further, a signature can be generated and distributed (e.g., to other data appliances) to automatically block future file transfer requests to download the document.

Figure 2:
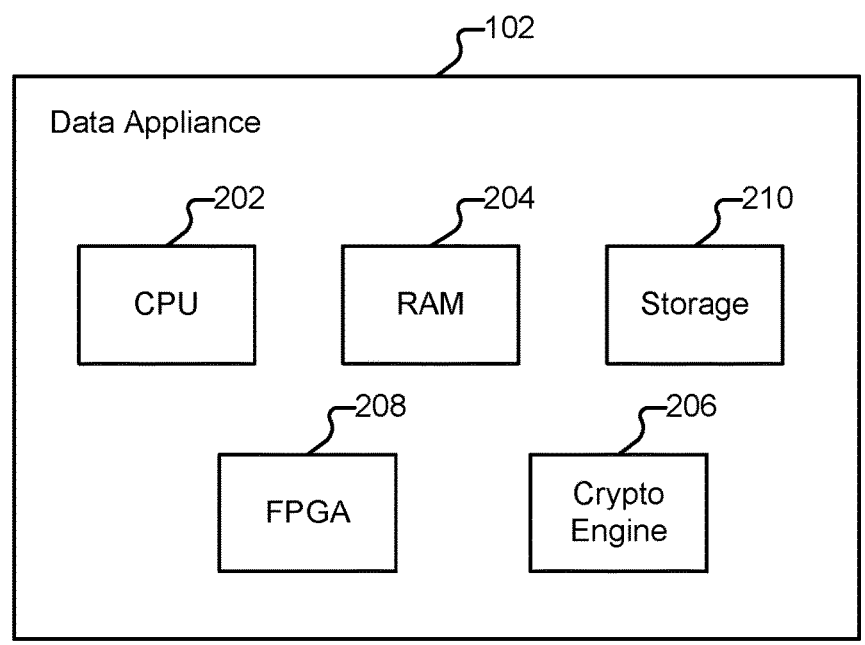
FIG. 2 illustrates an embodiment of a data appliance.

FIG. 2 illustrates an embodiment of a data appliance. The example shown is a representation of physical components that are included in appliance 102, in some embodiments. Specifically, appliance 102 includes a high performance multi-core CPU 202 and RAM 204. Appliance 102 also includes a storage 210 (such as one or more hard disks), which is used to store policy and other configuration information, signatures, and other information (described in more detail below). Data appliance 102 can also include one or more optional hardware accelerators. For example, data appliance 102 can include a cryptographic engine 206 configured to perform encryption and decryption operations, and one or more FPGAs 208 configured to perform matching, act as network processors, and/or perform other tasks.

Appliance 102 can take a variety of forms. For example, appliance 102 can be a dedicated device or set of devices. The functionality provided by appliance 102 can also be integrated into or executed as software on a general purpose computer, a computer server, a gateway, and/or a network/routing device. For example, in some embodiments services provided by data appliance 102 are instead (or in addition) provided to client 104 by software executing on client 104.

Whenever appliance 102 is described as performing a task, a single component, a subset of components, or all components of appliance 102 may cooperate to perform the task. Similarly, whenever a component of appliance 102 is described as performing a task, a subcomponent may perform the task and/or the component may perform the task in conjunction with other components. In various embodiments, portions of appliance 102 are provided by one or more third parties. Depending on factors such as the amount of computing resources available to appliance 102, various logical components and/or features of appliance 102 may be omitted and the techniques described herein adapted accordingly. Similarly, additional logical components/features can be added to appliance 102 as applicable.

PDF Documents and Example Exploits

The PDF file format is used to represent documents in a manner independent of the application software, hardware, and operating system used to create them and of the output device on which they are to be displayed or printed. As a page description language, although the PDF format may focus on document description more than on object manipulation, it also contains programming-like characteristics (e.g., user-defined actions, support for JavaScript) that can be subverted or misused by an attacker. Malicious parties frequently leverage the combination of multiple PDF-specific functions to deliver a successful attack.

A PDF document comprises a collection of objects that together describe the appearance of one or more pages, optionally accompanied by additional interactive elements and higher-level application data. A PDF file contains the objects making up a PDF document along with associated structural information, all represented as a single self-contained sequence of bytes. In particular, a given page in a PDF document can contain any combination of text, graphics, and images. The appearance of a page is described by a PDF content stream which contains a sequence of graphics objects to be painted on the page. A PDF document can also contain interactive elements such as annotations, actions triggered by keyboard or mouse, and interactive forms.

Figure 3:
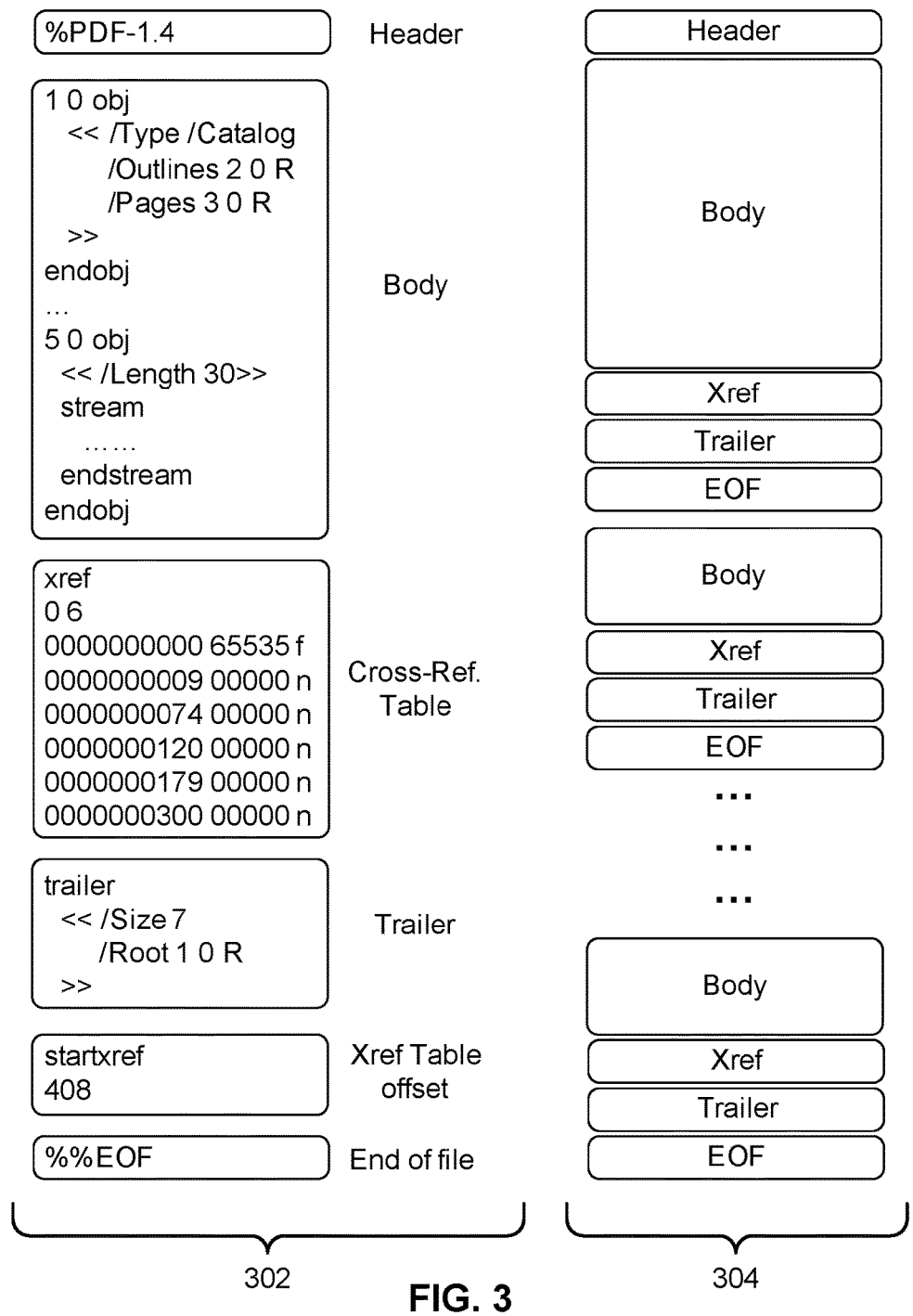
FIG. 3 illustrates two views of the structure of a canonical PDF file.

FIG. 3 illustrates two views of the structure of a canonical PDF file. As shown in region 302, the basic structure of a PDF includes a header, a body (a set of objects), a cross-reference table, a trailer, and an end-of-file marker. The PDF adopts an incremental update mechanism. That is, a PDF file is not overwritten, but is instead added to. Each time a PDF file is edited, an addendum is appended to the tail of the file. Therefore, there may exist multiple trailers, xref tables, and end-of-file markers in a given document, as illustrated in region 304.

Due to factors such as the support of JavaScript by the PDF specification, as well as the flexibility of the language and its ease of use, JavaScript is widely utilized in malicious PDFs. One example of such an exploit that can be included in a PDF is illustrated in FIG. 4. A vulnerable JavaScript function "media.newPlayer( )" is invoked to trigger the vulnerability so that the control will be transferred to the shellcode that has been sprayed in a PDF reader's process memory.

One approach to preventing JavaScript involved malicious PDFs is to disable the JavaScript support in PDF readers. Unfortunately, interactive features that rely on JavaScript in benign PDFs will also be disabled. Also, non-JavaScript involved malicious PDFs exist as well. For example, attackers can also leverage embedded Flash objects or XFA stream to exploit vulnerabilities in PDF readers.

In addition to exploiting vulnerabilities, attackers can also incorporate various obfuscation techniques, such as encoding with stream filters and JavaScript obfuscation methods, e.g., string splitting/concatenation, hex/base64 encoding, customized encoding/decoding functions, etc. The techniques described herein can be used to identify documents having features predictive of maliciousness, as will be described in more detail below.

Example Filter

Figure 5:
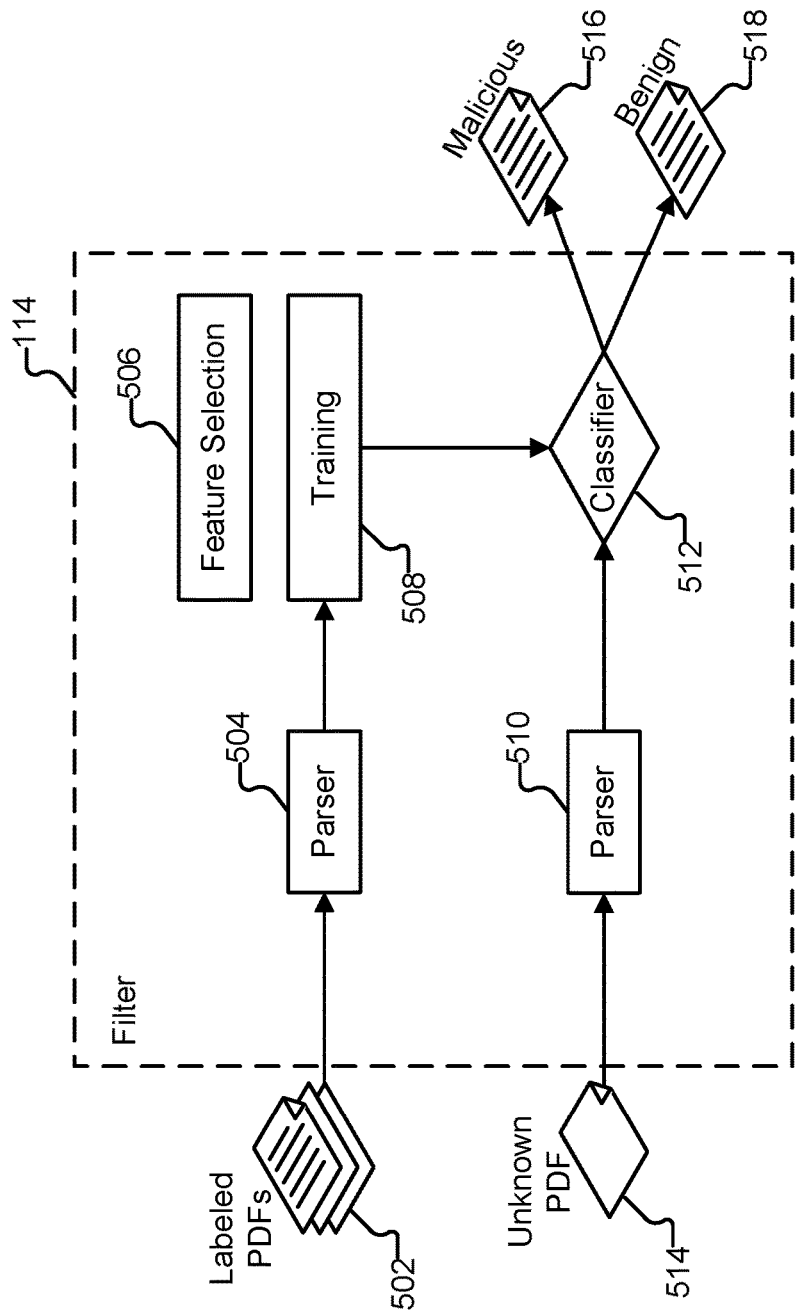
FIG. 5 illustrates various logical components of an embodiment of a filter.

FIG. 5 illustrates various logical components of an embodiment of a filter. As will be described in more detail below, filter 114 works as follows, in some embodiments. A set of PDFs 502, some of which are labeled malicious and some of which are labeled benign, are parsed by parser 504 to extract features. The set of benign and malicious samples can be obtained in a variety of ways. For example, the benign PDF examples can be collected from: (1) known legitimate PDF collections such as published conference papers; and (2) PDF search engines with a set of keywords that cover a wide variety of content. For malicious PDFs, known malicious repositories can be used, as can company virus databases. The parser is configured to generate an object representation of an input PDF file, e.g., to identify all the objects, streams, and fields/content within these objects.

The parser also supports encoding schemes used in the filters so that the encoded stream can be decoded for inspection. It takes a feature list as input and outputs the type (i.e., likely benign or likely malicious) of the PDF file under inspection.

Certain of the extracted features are selected (506) and used to train (508) classifier 512. As will be described in more detail below, features can be selected based on a variety of factors. For example, the set of features can be selected based on the analysis of the vulnerabilities in PDF format, the study of PDF related CVEs, and examples of real-world PDF exploits. The features can be generally classified into three categories: the structure of a PDF file, the PDF-specific functionalities implemented in a file, and the embedded code within a PDF file. As new exploits emerge (e.g., due to the discovery of new vulnerabilities or software updates), and/or when older exploits become less effective, new features can be extracted from new exploits and the feature set is updated accordingly.

PDFs having an unknown classification (514) are subsequently parsed by parser 510 and classified, using classifier 512, as being either likely malicious (516) or likely benign (518). Various modifications to the filter shown in FIG. 5 can be made, as applicable. For example, in some embodiments, parser 504 and parser 510 are the same parser. As another example, in some embodiments the classifier is trained on a first system (e.g., by a third party) and provided to appliance 102. In such a scenario, elements shown in FIG. 5 may be omitted from appliance 102's filter as applicable (such as the labeled PDFs 502 or parser 504).

Feature Selection

Embedded Code Features

Some PDF exploits leverage the capability provided by the embedded script code, and in particular, JavaScript code. In general, malicious PDFs are more likely to embed script code than benign PDFs. Further, the dynamic generation and inclusion features of JavaScript enable many obfuscation techniques that have been adopted by attackers when creating malicious PDFs. These obfuscation techniques often invoke certain JavaScript functions that are rarely observed in otherwise benign PDFs.

The following are examples of features on embedded code: the number of occurrences of/JavaScript action (also the /JS field) in both clear-format and encoded-format; and the invocation of suspicious JavaScript functions.

Occurrence of/JavaScript action: Malicious PDFs rely heavily on JavaScript code to deliver attacks. Suppose approximately 10% of the malicious PDF samples contain /JavaScript actions in the clear-form with an average 37.4 instances per file, while only 0.5% of the benign PDFs contain/JavaScript actions in clear-format. In encoded-format, the malicious PDFs contain 503.7 instances of/JavaScript actions per file on average, compared with benign PDFs, which only contain 1.3 instances of/JavaScript actions per file. The number of occurrences of/JavaScript actions can be used as a predictive feature of malicious PDFs, especially within the encoded stream.

Invocations of suspicious JS functions: To exploit certain vulnerabilities in the JavaScript APIs provided by PDF, a malicious PDF document invokes certain vulnerable functions. Although the invocation of a vulnerable JavaScript function does not necessarily raise an alarm, it is however a possible indication of malicious JavaScript code. FIG. 6 depicts a list of examples of suspicious JavaScript functions. These functions can be divided into two categories: 1) the function itself has vulnerabilities, e.g., util.printf( ), doc.media.newPlayer( ); and 2) the function is frequently invoked by malicious PDFs, e.g., str.substr( ), str.substring( ), str.fromCharCode( ), etc.

PDF Functionality Features

As a document description language, PDF provides a variety of functionalities to enrich the dynamic characteristics of a document. However, from a security point of view, some of these functionalities can be misused by a malicious party to pose a threat. Features can be extracted from these potentially harmful functionalities and can be divided into two categories: (1) potentially harmful PDF actions; and (2) misused PDF stream filters.

Potentially Harmful PDF Actions: Actions are defined in the PDF format to enable dynamic interaction among a document and people, the reader program, and the environment (e.g., the operating system). Among these actions, some are more harmful than others since the potential misuse of these operations can lead to the success of an attack. Some of these potentially harmful actions are not (very) dangerous alone. However, the leverage of a combination of several such actions may produce a serious PDF threat.

FIG. 7 lists example actions that can be considered as harmful. For example, /Action and/OpenAction can be used to specify functionalities performed upon a user's action or the PDF file being opened. Such functionalities include redirection (e.g., /GoTo, /GoToR, /GoToE), execution (e.g., /Launch) and accessing remote resources (e.g., /URI), etc.

Misused PDF Filters: The PDF format specifies ten standard stream filters to decode the data in a stream. FIG. 8 lists these ten stream filters. These filters are often used by attackers as well. Unlike benign PDFs, where these filters are mainly adopted for their capabilities in data compression, the favor for filters in malicious PDF files is because malicious content can be hidden in an encoded stream to evade static inspection.

Multiple filters can be cascaded to form a pipeline such that a stream can be encoded by more than one filter in sequence. For example, /Filter [/ASCII85Decode /LZWDecode] indicates the stream data is encoded using LZW and ASCII base-85 encoding and should be decoded following this entry in the stream dictionary. This feature further facilitates obfuscation because malicious content can be encoded by an arbitrary number of encoding schemes. Certain characteristics indicate the likely usage of filters in malicious PDFs, such as an excessive number of filters for one stream, a combination of filters that are rarely observed in benign PDFs, escaped filter name, etc. The stream filter related features, shown in FIG. 9, can be used to distinguish benign and malicious PDFs.

PDF Structure Features

Malicious PDFs can also exhibit a discrepancy with benign PDFs in their file structure. Two example ways this discrepancy can be leveraged are: (1) malformed/mismatched elements; and (2) statistics of the elements.

Malformed/Mismatched Elements: Malicious PDFs are more likely to contain malformed elements such as mismatched or missing objects than benign PDF files. In some embodiments, the following PDF structure related features are used: malformed elements, invalid elements, and misplaced elements. Examples of malformed elements include "startxref," "xref," and "trailer." The existence of these elements being malformed is highly related to a PDF file being malicious based on the analysis of known benign and malicious PDF files. For misplaced elements, a focus is given to script code that is placed after the entire file structure, i.e., after the last "EOF" marker.

Figure 10:
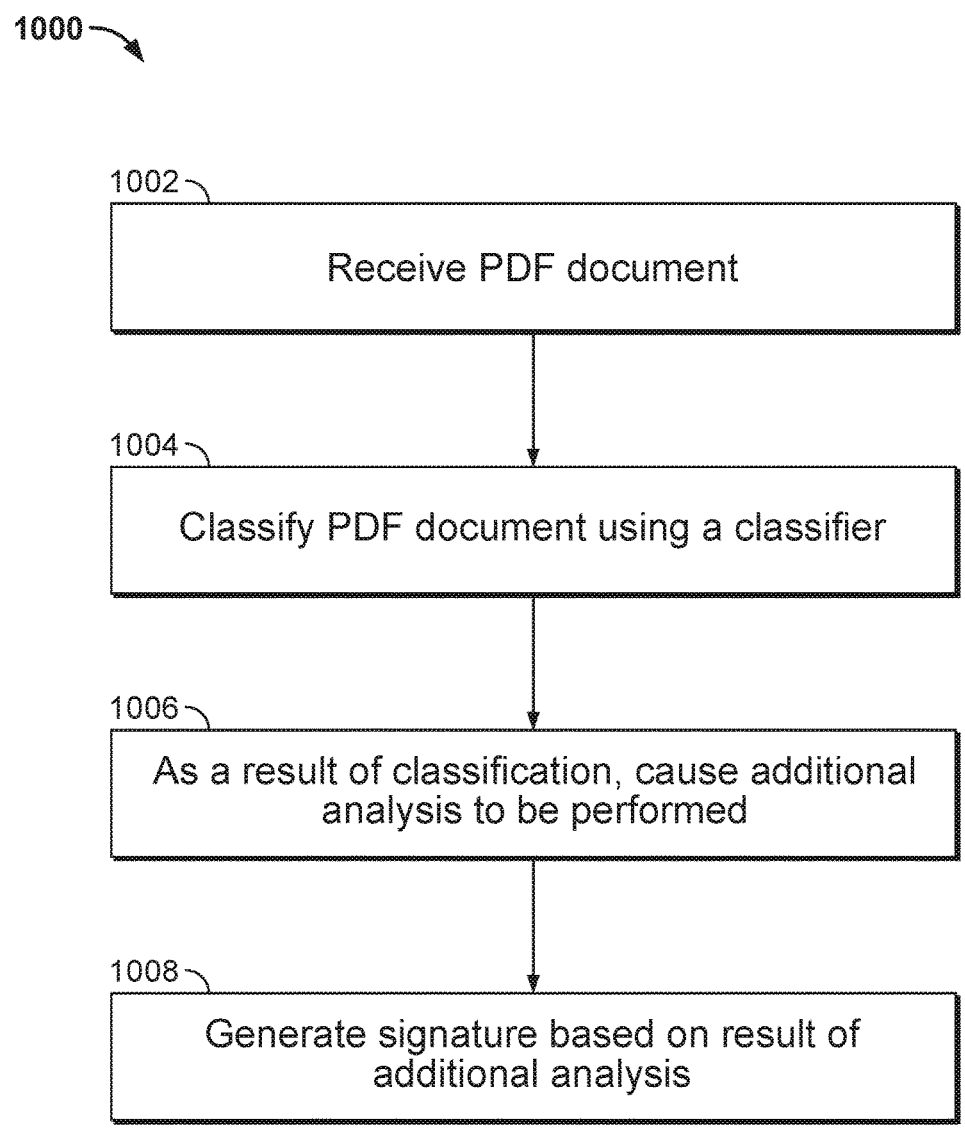
FIG. 10 illustrates an example of a process for detecting malicious PDF documents.

Statistics Features of Elements: From a statistical point of view, malicious PDFs can be different from benign PDFs in terms of average object size, total object number, etc. A list of example structure related features is as follows:

malformed "startxref"
    malformed "trailer"
    malformed "xref"
    the presence of code after the last "EOF"
    Average Obj size FIG. 10 illustrates an example of a process for detecting malicious PDF documents. In some embodiments, process 1000 is performed by data appliance 102. The process begins at 1002 when a PDF document is received. As one example, when host 120 attempts to transmit document 130 to client 104, document 130 is received by appliance 102 at 1002.

At 1004, the document received at 1002 is classified with a classifier. As one example, data appliance 102 provides document 130 to filter 114 (e.g., as unknown PDF 514 shown in FIG. 5). Classifier 512 classifies the document at 1004 as being either likely benign (518) or likely malicious (516). In some embodiments, additional processing may be performed based on the classification determined by classifier 512 (1006). If the document is classified as likely benign, no additional processing may take place (i.e., the likely benign documents are filtered out of additional processing). If the document is classified as likely malicious, however, a variety of actions can be taken. As one example, appliance 102 can perform additional analysis on the document, including opening the PDF document in a virtual machine and observing for any malicious behaviors. As another example, appliance 102 can transmit the document to cloud security service 122 for additional analysis.

Finally, in some embodiments, based on the additional processing performed at 1006, one or more signatures for the document is generated at 1008. As one example, suppose document 130 is classified as likely malicious at 1004 and transmitted to cloud security service 122 for additional processing at 1006. If cloud security service 122 determines that the document is in fact malicious, at 1008 it generates a signature usable to identify future copies of the document as malicious. The signature can be transmitted to data appliance 102, and can also be shared with other data appliances, as applicable.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive a first Portable Document Format (PDF) document;
classify the received first PDF document using a classifier trained at least in part using a set of features extracted from a plurality of training PDF documents, wherein a first classification that can be determined for the first PDF document is a classification of "likely benign" and wherein a second classification that can be determined for the first PDF document is a classification of "likely malicious", and wherein the plurality of training PDF documents comprise a set of PDF documents that were, at a time previous to the training of the classifier, known to be benign, and are labeled as belonging to a benign set, and wherein the plurality of training PDF documents further comprise a set of PDF documents that were, at a time previous to the training of the classifier, known to be malicious, and are labeled as belonging to a malicious set; and
wherein at least one feature extracted from the malicious set includes a feature associated with at least two stream filters cascaded to form a decoding pipeline; and
wherein, in the event the received first PDF document is classified as likely malicious, additional analysis of potential maliciousness of the first PDF document is caused to be performed, and wherein, in the event the received first PDF document is classified as likely benign, additional analysis of potential maliciousness of the first PDF document is not caused to be performed; and
a memory coupled to the processor and configured to provide the processor with instructions.

2. The system of claim 1 wherein causing the additional analysis to be performed on the first PDF document includes opening the first PDF document in a virtual machine and observing malicious behaviors.

3. The system of claim 1 wherein causing the additional analysis to be performed on the first PDF document includes transmitting the first PDF document to a remote service.

4. The system of claim 1 wherein the at least one feature extracted from the malicious set includes a feature associated with a "parseInt" JavaScript function.

5. The system of claim 1 wherein the at least one feature extracted from the malicious set includes a feature associated with a "RichMedia" annotation.

6. The system of claim 1 wherein the at least one feature extracted from the malicious set includes a feature associated with a Small Web Format (".swf") file format.

7. The system of claim 1 wherein the at least one feature extracted from the malicious set includes a feature associated with a malformed "startxref".

8. The system of claim 1 wherein the at least one feature extracted from the malicious set includes a feature associated with a malformed "trailer".

9. The system of claim 1 wherein the at least one feature extracted from the malicious set includes a feature associated with a malformed "xref".

10. The system of claim 1 wherein the at least one feature extracted from the malicious set includes a feature associated with an average object size.

11. The system of claim 1 wherein the processor is further configured to train the classifier.

12. A method, comprising:
receiving a first Portable Document Format (PDF) document;
classifying the received first PDF document using a classifier trained at least in part using a set of features extracted from a plurality of training PDF documents, wherein a first classification that can be determined for the first PDF document is a classification of "likely benign" and wherein a second classification that can be determined for the first PDF document is a classification of "likely malicious", and wherein the plurality of training PDF documents comprise a set of PDF documents that were, at a time previous to the training of the classifier, known to be benign, and are labeled as belonging to a benign set, and wherein the plurality of training PDF documents further comprise a set of PDF documents that were, at a time previous to the training of the classifier, known to be malicious, and are labeled as belonging to a malicious set; and wherein at least one feature extracted from the malicious set includes a feature associated with at least two stream filters cascaded to form a decoding pipeline; and wherein, in the event the received first PDF document is classified as likely malicious, additional analysis of potential maliciousness of the first PDF document is caused to be performed, and wherein, in the event the received first PDF document is classified as likely benign, additional analysis of potential maliciousness of the first PDF document is not caused to be performed.

13. A computer program product embodied in a non-transitory tangible computer readable storage medium and comprising computer instructions for:

receiving a first Portable Document Format (PDF) document;

classifying the received first PDF document using a classifier trained at least in part using a set of features extracted from a plurality of training PDF documents, wherein a first classification that can be determined for the first PDF document is a classification of "likely benign" and wherein a second classification that can be determined for the first PDF document is a classification of "likely malicious", and wherein the plurality of training PDF documents comprise a set of PDF documents that were, at a time previous to the training of the classifier, known to be benign, and are labeled as belonging to a benign set, and wherein the plurality of training PDF documents further comprise a set of PDF documents that were, at a time previous to the training of the classifier, known to be malicious, and are labeled as belonging to a malicious set; and wherein at least one feature extracted from the malicious set includes a feature associated with at least two stream filters cascaded to form a decoding pipeline; and wherein, in the event the received first PDF document is classified as likely malicious, additional analysis of potential maliciousness of the first PDF document is caused to be performed, and wherein, in the event the received first PDF document is classified as likely benign, additional analysis of potential maliciousness of the first PDF document is not caused to be performed.

14. A system, comprising:
a processor configured to:
  receive a first Portable Document Format (PDF) document;
  classify the received first PDF document using a classifier trained at least in part using a set of features extracted from a plurality of training PDF documents, wherein a first classification that can be determined for the first PDF document is a classification of "likely benign" and wherein a second classification that can be determined for the first PDF document is a classification of "likely malicious", and wherein the plurality of training PDF documents comprise a set of PDF documents that were, at a time previous to the training of the classifier, known to be benign, and are labeled as belonging to a benign set, and wherein the plurality of training PDF documents further comprise a set of PDF documents that were, at a time previous to the training of the classifier, known to be malicious, and are labeled as belonging to a malicious set; and wherein at least one feature extracted from the malicious set includes a feature associated with an escaped filter name; and wherein, in the event the received first PDF document is classified as likely malicious, additional analysis of potential maliciousness of the first PDF document is caused to be performed, and wherein, in the event the received first PDF document is classified as likely benign, additional analysis of potential maliciousness of the first PDF document is not caused to be performed; and a memory coupled to the processor and configured to provide the processor with instructions.

15. A system, comprising:
a processor configured to:
  receive a first Portable Document Format (PDF) document;
  classify the received first PDF document using a classifier trained at least in part using a set of features extracted from a plurality of training PDF documents, wherein a first classification that can be determined for the first PDF document is a classification of "likely benign" and wherein a second classification that can be determined for the first PDF document is a classification of "likely malicious", and wherein the plurality of training PDF documents comprise a set of PDF documents that were, at a time previous to the training of the classifier, known to be benign, and are labeled as belonging to a benign set, and wherein the plurality of training PDF documents further comprise a set of PDF documents that were, at a time previous to the training of the classifier, known to be malicious, and are labeled as belonging to a malicious set; and wherein at least one feature extracted from the malicious set includes a feature associated with an unsupported filter; and wherein, in the event the received first PDF document is classified as likely malicious, additional analysis of potential maliciousness of the first PDF document is caused to be performed, and wherein, in the event the received first PDF document is classified as likely benign, additional analysis of potential maliciousness of the first PDF document is not caused to be performed; and a memory coupled to the processor and configured to provide the processor with instructions.

* * * * *

UNITED STATES PATENT AND TRADEMARK OFFICE
CERTIFICATE OF CORRECTION

Page 1 of 2

PATENT NO. : 10,169,579 B1
APPLICATION NO. : 13/631518
DATED : January 1, 2019
INVENTOR(S) : Wei Xu et al.

It is certified that error appears in the above-identified patent and that said Letters Patent is hereby corrected as shown below:

On the Title Page

After the abstract, delete "15 Claims," and insert --17 Claims,--.

In Page 2, References Cited, Item (56), Other Publications, delete "Baccas, Finding Rules for Heuristic Detection of Malicious PDFs: with Analysis of Embedded Exploit Code, Virus Bulletin Conference Sep. 2010, Published 2010, pdfs.semanticscholar.org/a265/745ac08159dd3d8aa0fe2cc5f7e465bd3200.pdf. (Year: 2010)." and insert --Baccas, Finding Rules for Heuristic Detection of Malicious PDFs: with Analysis of Embedded Exploit Code, Virus Bulletin Conference Sep. 2010, Published 2010, pdfs.semanticscholar.org/a265/745ac08159dd3d8aa0fe2cc5f7e465bd3200.pdf. (Year: 2010).--, therefor.

In the Claims

In Column 7, Claim 1, Line 63, delete ""likely malicious"," and insert --"likely malicious,"--, therefor.
In Column 8, Claim 12, Line 60, delete ""likely malicious"," and insert --"likely malicious,"--, therefor.
In Column 9, Claim 13, Line 26, delete ""likely malicious"," and insert --"likely malicious,"--, therefor.
In Column 9, Claim 14, Line 57, delete ""likely malicious"," and insert --"likely malicious,"--, therefor.
In Column 10, Claim 15, Line 34, delete ""likely malicious"," and insert --"likely malicious,"--, therefor.

Insert New Claim 16 --A method, comprising: receiving a first Portable Document Format (PDF) document; classifying the received first PDF document using a classifier trained at least in part using a set of features extracted from a plurality of training PDF documents, wherein a first classification that can be determined for the first PDF document is a classification of "likely benign" and wherein a second classification that can be determined for the first PDF document is a Signed and Sealed this
Twenty-eighth Day of May, 2019

Andrei Iancu
*Director of the United States Patent and Trademark Office*

CERTIFICATE OF CORRECTION (continued)
U.S. Pat. No. 10,169,579 B1 classification of "likely malicious," and wherein the plurality of training PDF documents comprise a set of PDF documents that were, at a time previous to the training of the classifier, known to be benign, and are labeled as belonging to a benign set, and wherein the plurality of training PDF documents further comprise a set of PDF documents that were, at a time previous to the training of the classifier, known to be malicious, and are labeled as belonging to a malicious set; and wherein at least one feature extracted from the malicious set includes a feature associated with an escaped filter name; and wherein, in the event the received first PDF document is classified as likely malicious, additional analysis of potential maliciousness of the first PDF document is caused to be performed, and wherein, in the event the received first PDF document is classified as likely benign, additional analysis of potential maliciousness of the first PDF document is not caused to be performed.--.

Insert New Claim 17 --A method, comprising: receiving a first Portable Document Format (PDF) document; classifying the received first PDF document using a classifier trained at least in part using a set of features extracted from a plurality of training PDF documents, wherein a first classification that can be determined for the first PDF document is a classification of "likely benign" and wherein a second classification that can be determined for the first PDF document is a classification of "likely malicious," and wherein the plurality of training PDF documents comprise a set of PDF documents that were, at a time previous to the training of the classifier, known to be benign, and are labeled as belonging to a benign set, and wherein the plurality of training PDF documents further comprise a set of PDF documents that were, at a time previous to the training of the classifier, known to be malicious, and are labeled as belonging to a malicious set; and wherein at least one feature extracted from the malicious set includes a feature associated with an unsupported filter; and wherein, in the event the received first PDF document is classified as likely malicious, additional analysis of potential maliciousness of the first PDF document is caused to be performed, and wherein, in the event the received first PDF document is classified as likely benign, additional analysis of potential maliciousness of the first PDF document is not caused to be performed.--.